Feb. 2, 1965 D. B. LE MAY ETAL 3,167,954
MASS FLOW RATE SENSOR FOR COMPRESSORS
Original Filed June 15, 1956 3 Sheets-Sheet 1

DAN B. LEMAY,
WILTON E. PARKER,
CARLTON H. PAUL,
ALEXANDER SILVER,
PAUL G. STEIN,
HOMER J. WOOD,
INVENTORS,

BY
Herschel C. Omohundro
ATTORNEY

United States Patent Office 3,167,954
Patented Feb. 2, 1965

3,167,954
MASS FLOW RATE SENSOR FOR COMPRESSORS
Dan B. Le May, Palos Verdes Estates, and Wilton Everts Parker, Encino, Calif., Carlton Hutton Paul, Scottsdale, Ariz., Alexander Silver, East Woodland Hills, Calif., Paul G. Stein, Phoenix, Ariz., and Homer J. Wood, Sherman Oaks, Calif., assignors to The Garrett Corporation, Los Angeles, Calif., a corporation of California
Original application June 15, 1956, Ser. No. 591,591. Divided and this application Apr. 29, 1959, Ser. No. 809,810
11 Claims. (Cl. 73—168)

This invention relates generally to gas turbine engines, and more particularly to engines capable of furnishing auxiliary power for use in operating a variety of airborne aircraft equipment or accessories.

This is a true division of our application Serial No. 591,591, filed June 15, 1956, now U.S. Patent No. 3,060,686, entitled Augmented Gas Turbine Engine and Controls.

The present application is directed to a mass flow rate sensor shown in association with and forming a part of the augmented gas turbine engine and controls of such patent, and reference thereto may be had for a more complete understanding of the use of the instant invention.

An object of this invention is to provide a control mechanism for an auxiliary gas turbine for aircraft which is capable of automatically controlling its own operation under varying conditions of power output when an aircraft is on the ground, or when the aircraft is in flight at varying altitudes under conditions wherein said auxiliary engine is receiving augmentation air from the main engine of the aircraft.

Another object of the invention is to provide a control mechanism for an auxiliary gas turbine engine having means for operating a variable area nozzle at the inlet of the turbine wheel in response to a flow condition through the compressor, whereby a flow condition through the turbine is automatically matched with that of the compressor.

Another object of the invention is to provide control mechanism for a gas turbine engine having a variable area nozzle at the inlet of the turbine, said nozzle being controlled by a device sensitive to flow through the compressor of the engine, whereby the turbine is matched with said compressor when operating at varying speeds, thereby maintaining optimum fuel economy and performance of the engine.

Another object of the invention is to provide control mechanism for a gas turbine compressor which is adapted to deliver pneumatic power and wherein a variable area nozzle at the inlet of the turbine is controlled by a device sensing flow through the compressor, whereby flow through said compressor and said turbine may be maintained at optimum conditions, and whereby said variable area nozzle is automatically opened to permit additional air to flow from the compressor through the turbine exhaust to thereby prevent a surge condition of the compressor when the demand for pneumatic power therefrom is reduced and a critical flow condition through said compressor is likely to occur.

Another object of the invention is to provide a gas turbine having novel means for sensing flow through its compressor in accordance with the operation thereof at varying altitudes.

Another object of the invention is to provide a gas turbine compressor arranged to deliver pneumatic power and having a variable area nozzle at the inlet of the turbine and a blowoff valve at the outlet of the compressor, both of which are controlled by a device sensitive to flow through the compressor, whereby a surge condition in the compressor is avoided by the automatic opening of the variable area nozzle and the blowoff valve when said device senses the approach of a surge condition in the compressor.

Further objects and advantages of the invention will be apparent from the following specification, appended claims and accompanying drawings, in which:

Figure 2:
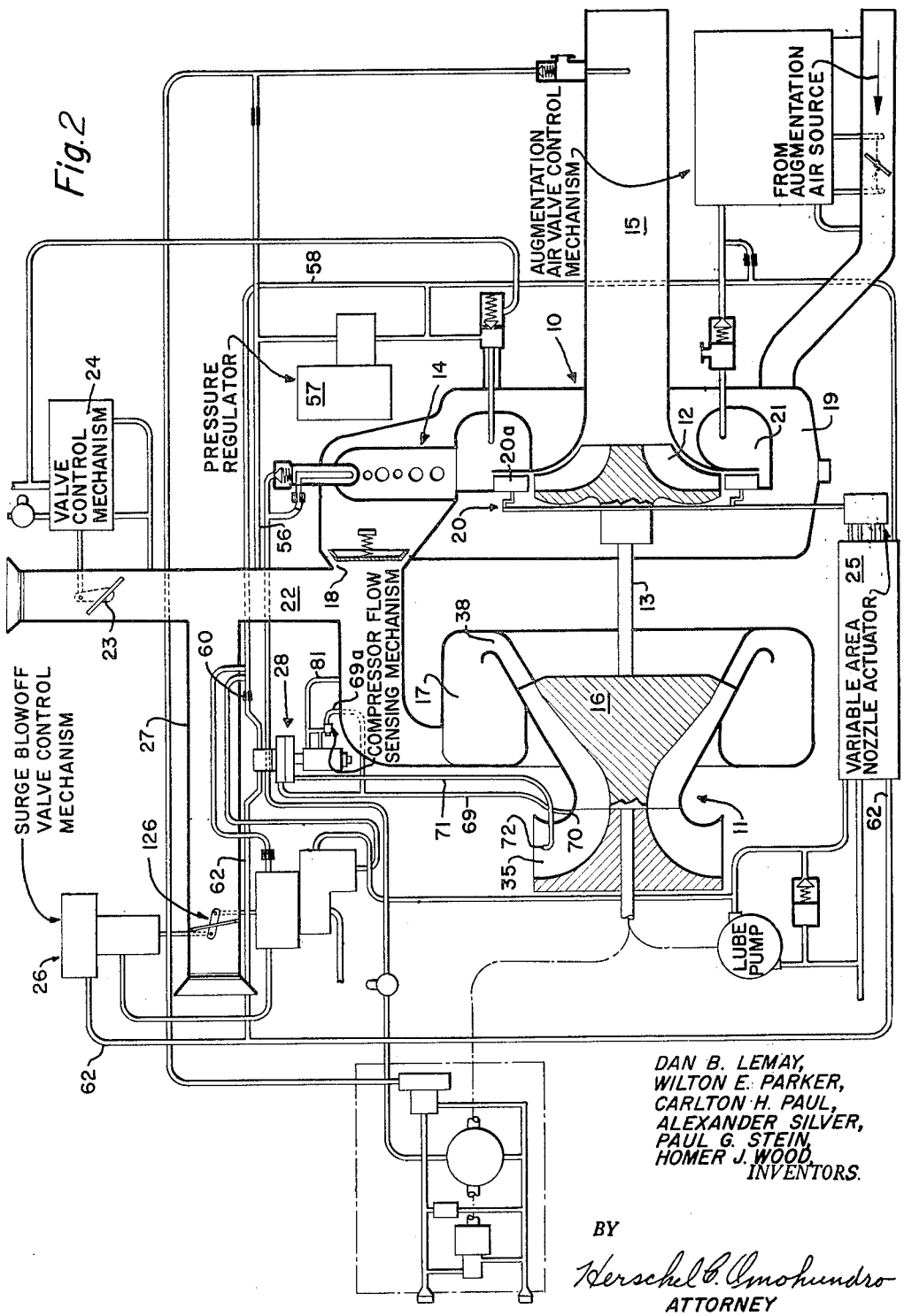
FIG. 2 is a diagrammatic view of the gas turbine compressor shown in FIG. 1 and having a mass flow sensing mechanism constructed according to the present invention embodied therein.

As shown diagrammatically in FIG. 2 of the drawing, the apparatus in general to which the control mechanism of the present invention is applied includes a gas turbine 10, a compressor 11 connected with the turbine for operation thereby, and various devices for controlling the operation of the turbine and structure associated therewith. The turbine 10 has a wheel 12 connected to a shaft 13 for rotation in response to the flow of heated gases from a combustor 14 to an exhaust passage 15. Rotary motion of the turbine wheel is transmitted by the shaft 13 to an impeller 16 forming a part of the compressor 11, the movement of the impeller drawing air into the compressor inlet and discharging the air into a plenum 17 forming a part of the compressor. The plenum 17 communicates, as at 18, with a second plenum 19 forming part of the turbine, some of the air discharged from the compressor generally being employed to support combustion of fuel supplied to the combustor 14. A variable area nozzle mechanism, indicated generally at 20, is provided with adjustable vanes forming a plurality of variable area nozzles 20a between an inlet manifold 21, communicating with the combustor, and the turbine wheel 12 to control gas flow to the wheel and consequently the rate of operation of the turbine and compressor.

To conduct pneumatic power from the compressor to a point of use, the plenum 17 has a duct 22 leading therefrom, this duct containing a valve 23 to control flow from the compressor. Mechanism indicated generally by the numeral 24 is provided to control the operation of the valve 23.

In the operation of compressors of the type shown herein, there is a danger of a surge condition, which may damage the apparatus, occurring when the demand for air delivered by the compressor is suddenly reduced or completely interrupted, such as by the closure of valve 23 in duct 22.

To eliminate or prevent the occurrence of surge conditions, two devices have been provided, one being an actuating device, designated generally by the numeral 25 for the variable area nozzle mechanism 20, and the other being a surge blowoff valve mechanism, generally indicated by the numeral 26, including a duct section 27 branching from duct 22. The operations of the two surge eliminating or preventing devices 25 and 26 are under the control of a compressor flow sensing mechanism forming the subject matter of the present invention and generally indicated by the numeral 28. The details of construction and operation of the mechanism 28 are set forth hereinafter; the details of construction and operation of devices and controls 24, 25 and 26 are set forth in the patent mentioned above.

Figure 1:
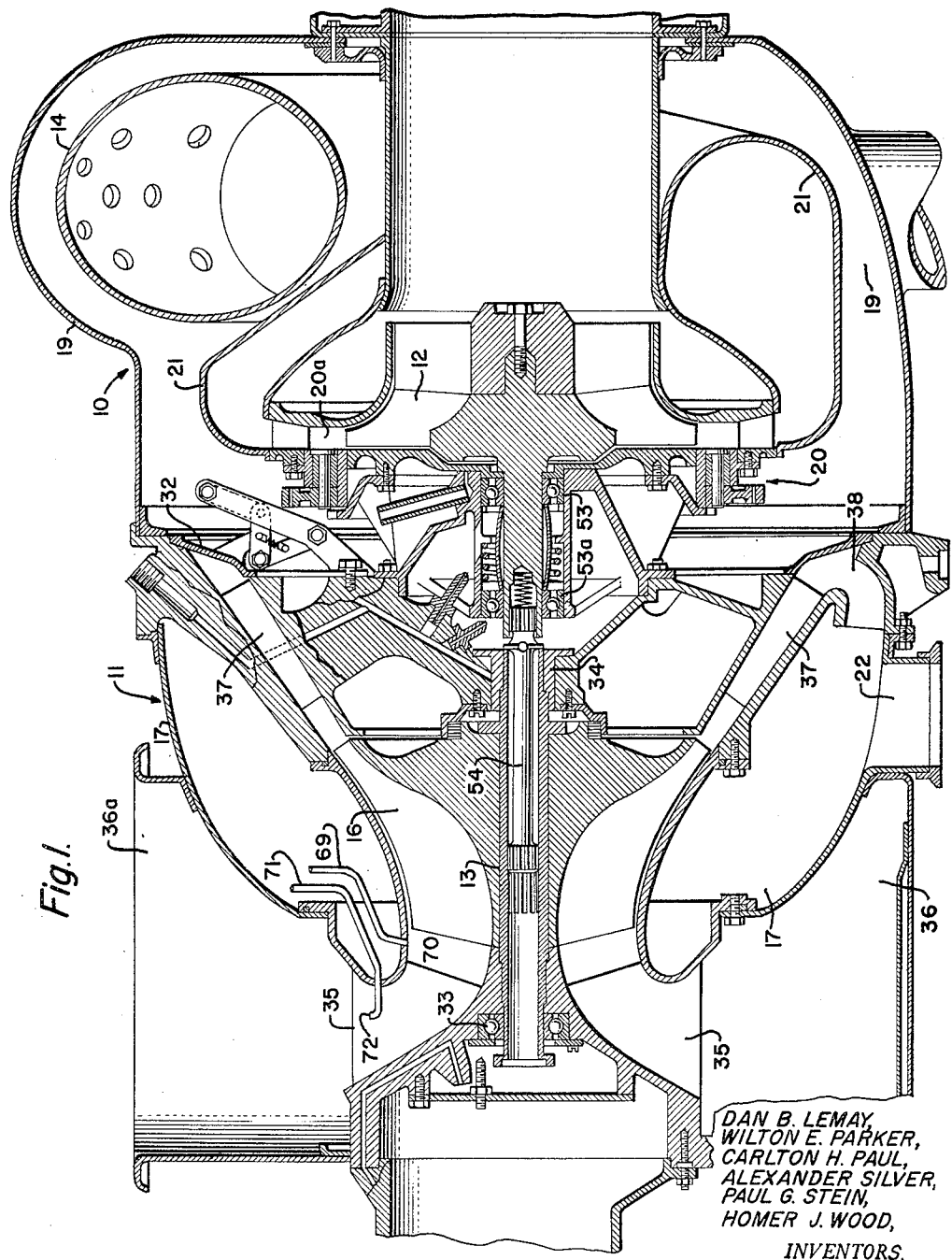
FIG. 1 is an axial sectional view of a gas turbine compressor to which control mechanism embodying the present invention has been adapted.

As shown in FIG. 1 of the drawing, the compressor 11, which is commonly known as a mixed flow compressor, has a single-stage wheel 16 supported on the shaft 13 which is rotatably mounted in bearings 33 and 34. Adjacent to the inlet of the compressor 11 are guide vanes 35 which communicate with a compressor inlet plenum 36. The plenum 36 is provided with an opening 36a, which communicates with atmosphere and serves as an inlet to the plenum 36. Communicating with the outlet of the compressor 11 are diffuser vanes 37. These diffuser vanes are disposed radially and axially, and communicate with a diffuser outlet passage 38, which is substantially annular and extends in a reverse direction with respect to flow emerging from the diffuser vanes 37. The passage 38 communicates with the compressor output plenum 17, which surrounds the diffuser section of the compressor in which the vanes 37 are disposed. Communicating with the compressor output plenum 17 is the bleed duct 22 which is arranged to conduct compressed air from the compressor toward a point of use. Associated with the bleed duct 22, as shown in FIG. 2, is the load control valve 23, and the valve control mechanism, indicated generally at 24, which may be similar to that disclosed in the patent application of Alexander Silver for Load Control Valve With Inverse Rate Type Compressor Pressure Conserver, Serial No. 400,638, filed December 28, 1953, now abandoned in favor of a continuation-in-part Serial No. 17,221, filed March 23, 1960, now Patent No. 3,080,713, or any other suitable type.

The wheel 12 of the turbine 10 is rotatably mounted in bearings 53 and 53a and is connected in driving relation with the shaft 13, and the compressor impeller 16, by means of a quill shaft 54. The variable area nozzles 20a are disposed at the inlet of the turbine wheel 12 to control flow therethrough, in accordance with the various other functions of the gas turbine compressor, as described in the patent mentioned above.

Figure 3:
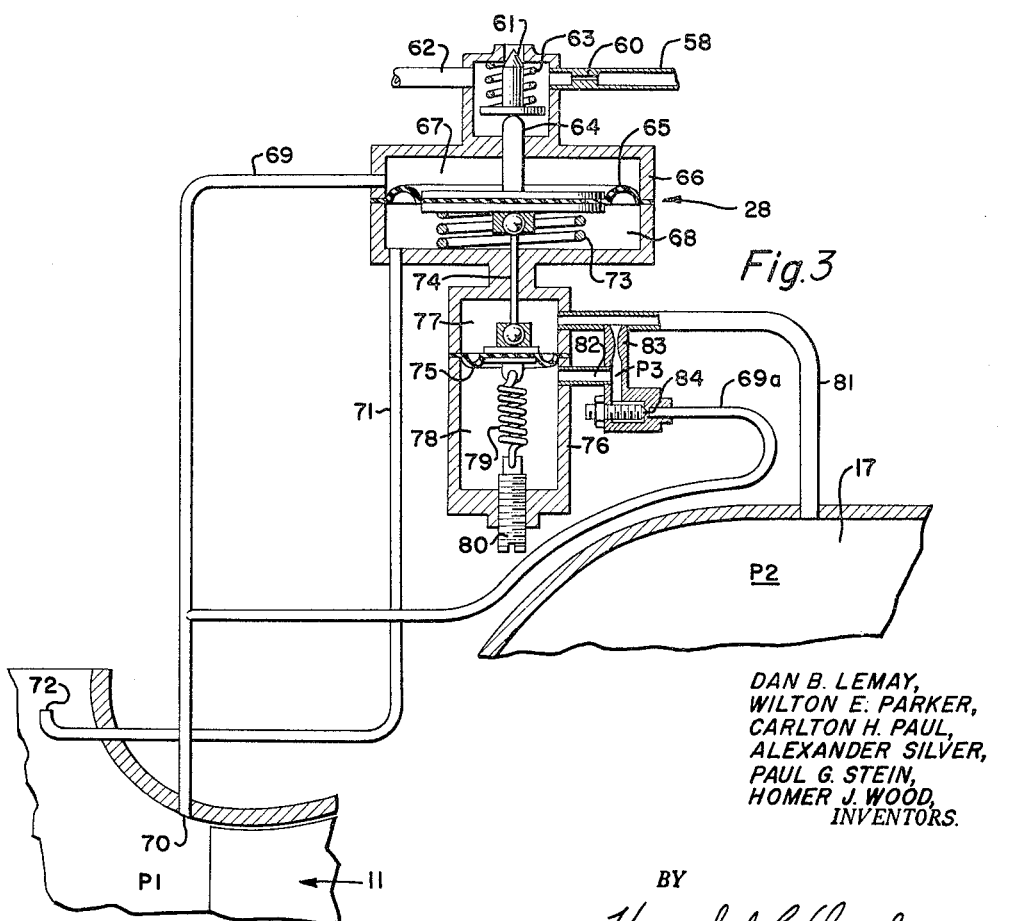
FIG. 3 is an enlarged, fragmentary, detailed, diagrammatic view, partly in section, of the compressor flow sensing device, shown in block diagram in FIG. 2 of the drawing.

As shown in FIG. 2 of the drawings, a tube 56 communicates with the bleed duct 22 and is connected to a pressure regulator 57 of any suitable type, having an output pressure conducting tube 58 which extends to the compressor flow sensing mechanism 28, shown in detail in FIG. 3. An orifice 60 is disposed in the tube 58 upstream of the compressor flow sensing mechanism to restrict the flow of air thereto. Referring to FIG. 3 of the drawings it will be seen that the flow sensing mechanism is provided with a bleedoff valve element 61. This bleedoff valve 61 is operable in response to flow conditions through the compressor 11 for the purpose of varying control pressure in a signal pressure output tube 62.

A spring 63 tends to move the bleedoff valve 61 toward an open position, which movement is controlled through a stem 64 by a pressure responsive diaphragm 65 positioned in a casing 66. The casing 66 is provided with chambers 67 and 68 communicating with opposite sides of the diaphragm 65. A static pressure sensing tube 69 intercommunicates with the chamber 67 and the inlet of the compressor 11. One end 70 of the tube 69, which senses static pressure at the inlet of compressor 11, is located within a restricted flow area therein. A tube 71 communicating with the chamber 68 is provided with an open end 72 directed upstream of the compressor inlet, to sense total pressure therein. Thus, the diaphragm 65, during operation of the compressor 11, is subjected to a differential between total and static pressures, which reflects Mach number or velocity of flow at the compressor inlet. A spring 73, in the chamber 68, tends to force the diaphragm 65 toward the chamber 67 and toward a closing direction of the bleedoff valve 61.

Connected to the diaphragm 65 by means of a link 74 is a relatively smaller diaphragm 75, which is disposed in a casing 76, having chambers 77 and 78 communicating with opposite sides of the diaphragm 75. A spring 79 is connected to the diaphragm 75 and is adjustably supported in the casing 76 by a screw 80. The screw 80 is arranged to adjust tension of the spring 79 for calibration adjustment to balance that of the spring 73. Communicating with the chamber 77 is a tube 81 which is connected with the compressor plenum 17, whereby compressor output pressure is sensed on the side of the diaphragm 75 exposed to the chamber 77. A tube 82 extends from chamber 78 and communicates with a branch tube 69a at a point intermediate flow dividing orifices 83 and 84 disposed in series therein. The branch tube 69a is connected at one end with tube 81 and at the other with tube 69. The latter end of tube 69a may in some instances be left open to the atmosphere. The flow dividing orifice 83 is a fixed venturi type orifice, the effective area of which remains constant during all choked conditions of the orifice, even though the pressure at the inlet thereof may vary. The flow dividing orifice 83 communicates with the tube 81, which senses compressor output pressure existing in the plenum 17. The orifice 84 is adjustable for calibration purposes and communicates with the compressor inlet pressure, or ambient pressure, via tubes 69a and 69.

As shown in FIG. 3 and as used hereinafter, P1 refers to pressure existing at the inlet of compressor 11; P2 refers to pressure existing in the compressor outlet plenum 17; and P3 refers to pressure existing between the flow dividing orifices 83 and 84 and in the chamber 78. The orifices 83 and 84, cooperating with the diaphragm 75, are arranged to reflect pressure ratio across the compressor 10. During operation of the compressor, a pressure differential is created across the diaphragm 75, causing a force thereon which corresponds to the presssure differential across the compressor 11. It will be understood that the pressure differential across the diaphragm 75 is, therefore, variable in proportion to the pressure differential existing across the compressor 11. This differential across the diaphragm 75 is maintained by the functioning of the orifices 83 and 84 in response to the pressure differential existing across the compressor 11.

Referring to FIG. 3 of the drawings, it will be seen that P2 exists in chamber 77 and that P3 exists in chamber 78, and since P3 is normally lower than P2, a pressure differential exists across the diaphragm which tends to force the diaphragm 75 toward the chamber 78. The pressure differential across the diaphragm 75 is changed by a change of P2 in chamber 77; for example, an increase of P2 tends to change the differential across the diaphragm 75, causing it to exert a force thereon toward the chamber 78. The orifice 83 is a fixed venturi type orifice, and when operating in choked condition its effective area remains constant, regardless of changes in pressures at its inlet. At the same time, the sharp edged orifice 84, when subjected to a varied pressure at its inlet, experiences a change in its effective area. Thus, with each change in P3 following a change in P2, the effective area of the orifice 84 changes slightly, which makes a slight additional change in P3. For example, when P3 increases, the effective area of orifice 84 increases slightly, tending to reduce P3 to a slight degree; conversely, when P3 decreases, the opposite effect takes place. Therefore, operation of the orifice 84 has a tendency toward changing the pressure differential existing across the diaphragm 75, following changes in P2. It will be understood that the pressure differential across the diaphragm 75 is, therefore, substantially proportional to the absolute value of pressure P2, but is varied slightly from linear proportionality with P2 by the correspondence of the effective area of the sharp edged orifice 84 with compressor pressure ratio P2/P1. This effect provides for a non-linear function corresponding to a desired compressor performance curve which represents the most efficient functional relationship of a particular compressor with respect to compressor pressure ratio and mass flow. Normally, forces acting on the diaphragm 65 balance those acting on the diaphragm 75, whereby a modulating action of the bleedoff valve 61 provides signal control pressure in the tube 62 for controlling operation of an actuator 25, described in detail in Patent No. 3,060,686, which controls the variable area nozzle mechanism 20 of the turbine. The nozzles 20a, when moved further in an opening direction by the mechanism 20, allow an increase in flow from the compressor 11; thus, the nozzles 20a have a direct effect upon Mach number or velocity of flow at the entrance to the compressor 11. Since weight flow through a compressor is directly related to the pressure ratio thereacross, when considering the efficiency of the compressor or its approach to a surge condition, the variable area nozzles 20a must automatically be adjusted according to these factors. The diaphragm 75, sensing a function of compressor outlet pressure, cooperates with the diaphragm 65, which senses compressor inlet Mach number, to provide desired flow through the compressor. For example, when a reduced flow condition through the compressor occurs, this condition is sensed by the tubes 69 and 71 communicating with chambers 67 and 68 at opposite sides of the diaphragm 65, whereupon the differential force across the diaphragm 65 is reduced. At the same time, assuming constant speed operation, a slight increase in P2/P1 occurs. The combination of these pressures causes diaphragms 65 and 75 to move in a direction to permit bleedoff valve 61 to open wider and cause venting of the signal control pressure tube 62. This action causes a reduced pressure signal which is transmitted to the actuator 25, causing it to further open the variable area nozzles 20a and to permit an increased flow through the compressor 11, thus avoiding a surge condition thereof. This increased flow condition through the compressor then is sensed by the tubes 69 and 71 communicating with chambers 67 and 68 at opposite sides of the diaphragm 65, whereupon the differential force across the diaphragm 65 again balances that across the diaphragm 75. It will be understood that total pressure sensed by the tube 71 is greater, relative to static pressure in the tube 69, with an increase in Mach number of flow through the compressor 11. Modulation of the valve element 61 thus establishes a control pressure output in the tube 62, which schedules a desired Mach number of flow entering the compressor, relative to P2/P1.

Assuming that the variable area nozzles 20a are in an over-capacity, open position, causing a mismatch of flow through the turbine 10, relative to flow through the compressor 11, the following operation may occur:

When the Mach number of flow entering the compressor is thus increased, relative to a reduced pressure ratio across the compressor, a resulting unbalance of the diaphragms 65 and 75 causes them to move the valve 61 toward a closed position, resulting in an increase of control pressure in the control pressure output tube 62. This increased control pressure causes actuator 25 to move the variable area nozzles toward a closed position, which thereby matches flow through the turbine 10, relative to flow through the compressor in a manner to restore the desired pressure ratio across the compressor 11, relative to Mach number of flow entering the compressor, and thereby effect an efficient operating condition thereof.

From the foregoing, it will be understood that the general function of the flow sensing device 28, relative to the compressor 11, is to schedule the Mach number of flow at the compressor inlet according to compressor pressure ratio. Inlet Mach number is a function of compressor inlet differential pressure (flow differential) divided by inlet total pressure. Pressure ratio is compressor outlet pressure divided by compressor inlet total pressure. Therefore, the ratio of diaphragms 65 and 75 and the area ratio of the flow dividers 83 and 84 may be varied according to a desired control function of the device 28 to match operating characteristics of various gas turbines. A further minor amount of nonlinear adjustment of the controller characteristics may be accomplished by varying the degree to which the vena contracta of the orifice 84 is suppressed by orifice shape, a sharp edged orifice being one extreme and a venturi shaped nozzle being the opposite extreme.

According to the present invention, the turbine 12 is provided with a plurality of variable area nozzles 20a which are opened in response to a reduced flow condition in the compressor when it approaches a surge condition. As hereinbefore described, the flow sensing device 28 generates a reduced pressure signal in the tube 62 when a reduced flow condition exists in the compressor 11. The signal control pressure tube 62 communicates with the variable area nozzle actuator 25, the details of which are disclosed in Patent No. 3,060,686, and transmits signal control pressure impulses thereto.

Communicating with the compressor bleed duct 22 is the branch duct 27 of the surge blowoff valve mechanism 26. The surge blowoff valve mechanism 26 is arranged to receive a signal from the flow sensing device 28 when a reduced flow condition exists in compressor 11, whereby a valve element 126 in the duct 27 is opened to avert an impending surge condition in the compressor, in the event such a condition is not first relieved by opening of the variable area nozzles 20a by the actuating device 25 cooperating with the flow sensor 28 as hereinabove described.

Details of the surge blowoff valve 26 and operations thereof are forth in Patent No. 3,060,686.

A reduced pressure signal generated by the flow sensing device 28 causes the valve 126 to open and prevent a surge condition in the compressor 10 by permitting an increased flow therethrough. It will be noted that the variable area nozzle actuator 25 is responsive to a signal magnitude which is nominal compared to that which causes operation of the surge relief valve 126. Thus, the surge relief valve 126 responds with a slight delay as compared to response of the variable area nozzle actuator 25. In this manner, the surge relief valve 126 opens after the variable area nozzles 20a have first opened to avert a surge condition in the compressor 11. In the event signal magnitude is nominal, the surge relief valve 126 may not open following surge relief operation of the variable area nozzle actuator 25. In addition, it will be understood that the variable area nozzle actuator 25, having high pressure hydraulic fluid delivered thereto, is capable of opening the variable area nozzles 20a more rapidly than opening operation of the valve 126 by attendant pneumatic forces which are of considerably lower p.s.i.

When the gas turbine compressor is not operating, reduced pressure permits the butterfly valve 126 to remain in open position. During starting operations of the gas turbine compressor, the valve 126 must be closed in order to permit the compressor 11 to build up sufficient pressure to support combustion in the combustor 14 and to accelerate the turbine 10. The valve 126 is held closed by hydraulic pressure from the gas turbine lubrication pump until compressor output pressure reaches a predetermined value, whereby output flow from the compressor will not be bled off until said compressor output pressure is of sufficient magnitude to cause the turbine to reach approximately 75 percent of its operating speed, as described in Patent No. 3,060,686.

While the mass flow rate sensor forming the subject matter of the invention has been illustrated as furnishing control signals to surge blowoff valve control mechanism and variable area nozzle actuators, it may also be used to provide control signals for any other suitable apparatus which it is desired to control in accordance with mass flow through a compressor.

We claim:

1. A mass flow sensor for compressors, comprising: total and static pressure sensing conduits formed for communication with the inlet of a compressor; first movable means having opposed surfaces communicating with said pressure sensing conduits and responsive to a differential between fluid pressures therein; a second pressure responsive movable means having opposed surfaces, said second pressure responsive means being connected to said first movable means; a first passage means formed for communication with the outlet of the compressor and one surface of said second pressure responsive movable means; a second passage having first and second pressure dividing orifices in series therein, said second passage communicating with said first passage means and a region of reduced pressure; means communicating with said second passage at a point between said orifices and the opposite side of said second pressure responsive movable means; a control pressure conduit communicating with said mass flow sensor for supplying fluid under pressure thereto; and a valve communicating with said control pressure conduit and operable by said first and second movable means to provide a pneumatic signal by modifying pressure of said fluid in said control pressure conduit in accordance with changes of mass flow through the compressor.

2. A mass flow sensor for compressors comprising: total and static pressure sensing conduits communicating with the inlet of a compressor; a first movable means having opposed surfaces communicating with said pressure sensing conduits and responsive to a differential between fluid pressures therein; a second movable means having opposed surfaces of different areas than those of said first movable means, said second movable means being connected to said first movable means; a passage means disposed to establish communication between the outlet of the compressor and one surface of said second movable means; a branch passage having first and second pressure dividing orifices in series with each other, said branch passage communicating with said passage means and a region of lower pressure; conduit means communicating with said branch passage between said orifices and the opposite surface of said second movable means; means forming a valve chamber for receiving control fluid pressure from a source thereof; and a valve in said valve chamber, said valve being operatively connected with said first and second movable means to provide a signal by modifying pressure of said fluid in said valve chamber in accordance with changes of mass flow through the compressor.

3. A mass flow sensor for compressors of the type having an inlet and an outlet comprising: first and second fluid pressure responsive elements connected for movement in unison; means for directing fluid pressures conforming to the total and static pressures at the inlet of a compressor to opposed portions of said first fluid pressure responsive element; means for directing fluid pressure conforming to compressor outlet pressure to one portion of said second fluid pressure responsive element to oppose the force of the fluid pressure conforming to the total pressure; means including a pair of sonic nozzles in series through which fluid pressure conforming to compressor outlet pressure is passed to a region of lower pressure to create a reference pressure and apply the same to an opposed portion of said second fluid pressure responsive element; and means actuated by said fluid pressure responsive elements to cause a variable signal.

4. A mass flow sensor for compressors of the type having an inlet and an outlet comprising: first and second fluid pressure responsive elements connected for movement in unison; resilient means tending to move said elements in one direction; means for directing fluid pressures conforming to the total and static pressures at the inlet of a compressor to opposed portions of said first fluid pressure responsive element; means for directing a fluid pressure conforming to compressor outlet pressure to one portion of said second fluid pressure responsive element to oppose the force of the fluid pressure conforming to said total pressure; passage means having a pair of serially arranged sonic nozzles through which fluid under pressure conforming to that in the compressor outlet is passed to a region of lower pressure, fluid flow through said nozzles producing a reference pressure in the passage means between said nozzles bearing a predetermined relation to the fluid pressure conforming to compressor outlet pressure; and means for applying fluid from said passage means at a point between said sonic nozzles to an opposed portion of said second fluid pressure responsive element, said fluid pressure responsive elements being moved in response to pressure variations applied thereto to actuate a signal transmitting means.

5. A mass flow sensor for compressors of the type having an inlet and an outlet comprising: first and second fluid pressure responsive elements connected for movement in unison; resilient means tending to move said elements in one direction; adjustable means for varying the force of said resilient means; means for directing fluid pressures conforming to the total and static pressures at the inlet of a compressor to opposed portions of said first fluid pressure responsive element; means for directing fluid pressure conforming to the compressor outlet pressure to one portion of said second fluid pressure responsive element to oppose the force of the fluid pressure conforming to the total pressure; passage means having a pair of serially arranged sonic nozzles through which fluid under pressure conforming to that in the compressor outlet is passed to a region of lower pressure, fluid flow through said nozzles producing a reference pressure in the passage means between said nozzles bearing a predetermined relation to the fluid pressure conforming to compressor outlet pressure; and means for applying fluid from said passage means at a point between said sonic nozzles to an opposed portion of said second fluid pressure responsive element, said fluid pressure responsive elements being moved in response to pressure variations applied thereto to actuate a signal transmitting means.

6. A mass flow sensor for compressors of the type having an inlet and an outlet comprising: first and second fluid pressure responsive elements connected for movement in unison; means for directing fluid pressures conforming to the total and static pressures at the inlet of a compressor to opposed portions of said first fluid pressure responsive element; means for directing fluid pressure conforming to compressor outlet pressure to one portion of said second fluid pressure responsive element to oppose the force of the fluid pressure conforming to the total pressure; passage means having a pair of sonic nozzles through which fluid pressure conforming to that in the compressor outlet is passed to a region of lower pressure, fluid flow through said nozzles producing a reference pressure in the passage means between said nozzles bearing a predetermined relation to the pressure conforming to the compressor outlet pressure; means for varying the effective area of one of said sonic nozzles; and means for applying fluid from said passage means at a point between said sonic nozzles to an opposed portion of said second fluid pressure responsive element, said fluid pressure responsive elements being moved in response to pressure variations applied thereto to actuate a signal transmitting means.

7. A mass flow sensor for compressors of the type having an inlet and an outlet comprising: a pair of fluid pressure responsive elements connected for movement in unison, said elements having a predetermined differential in areas; means for directing fluid under pressure conforming to the total pressure at the inlet of a compressor to the element with the greater area to tend to move said elements in one direction; means for directing fluid under pressure conforming to that in the compressor outlet to the element with the smaller area to tend to move said elements in the opposite direction; and means for applying a reference pressure to the element with the smaller area to oppose movement by the fluid pressure conforming to the compressor outlet pressure, said last named means having a series of sonic nozzles through which fluid under a pressure conforming to that in the compressor outlet flows to a region of lower pressure, the reference pressure being taken from between two nozzles in said series, said pressure responsive elements being moved in response to pressure variations applied thereto to actuate a signal transmitting means.

8. A mass flow sensor comprising: total and static pressure sensing conduits; a first movable means having opposed surfaces communicating with said pressure sensing conduits and responsive to a differential between fluid pressures therein; a second pressure responsive movable means having opposed surfaces, said second pressure responsive means being connected to said first movable means; a first passage means formed for communication with a source of variable pressure and one surface of said second pressure responsive movable means; a second passage having first and second pressure dividing orifices in series therein, said second passage communicating with said first passage means and a region of reduced pressure; means communicating with said second passage at a point between said orifices and the opposite side of said second pressure responsive movable means; a control pressure conduit communicating with said mass flow sensor for supplying fluid under pressure thereto; and a valve communicating with said control pressure conduit and operable by said first and second movable means to provide a pneumatic signal by modifying pressure of said fluid in said control pressure conduit in accordance with changes in pressures in said total and static pressure sensing conduits and said first passage means.

9. A mass flow sensor comprising: total and static pressure sensing conduits; a first movable means having opposed surfaces communicating with said pressure sensing conduits and responsive to a differential between fluid pressures therein; a second movable means having opposed surfaces of different areas than those of said first movable means, said second movable means being connected to said first movable means; a first passage means disposed to establish communication between a source of variable pressure and one surface of said second movable means; a branch passage having first and second pressure dividing orifices in series therein, said branch passage communicating with said first passage means and a region of lower pressure; conduit means communicating with said branch passage between said orifices and the opposite side of said second movable means; means forming a valve chamber for receiving control fluid pressure from a source thereof; and a valve in said valve chamber, said valve being operatively connected with said first and second moable means to provide a fluid pressure signal by modifying the pressure in said valve chamber in accordance with changes in pressure in said total and static pressure sensing conduits and in said first passage means.

10. A mass flow sensor comprising: first and second fluid pressure responsive elements connected for movement in unison; means for applying total and static pressures to opposed portions of said first fluid pressure responsive element; means for applying fluid pressure from a source thereof to one portion of said second fluid pressure responsive element to oppose the force of said total pressure; and means including a pair of sonic nozzles in series through which fluid pressure from the previously mentioned source is passed to a region of lower pressure to create a reference pressure and apply the same to an opposed portion of said second fluid pressure responsive element, said pressure responsive elements being moved in response to variations in pressure applied thereto to actuate a signal transmitting means.

11. A mass flow sensor comprising: first and second fluid pressure responsive elements connected for movement in unison; means for applying total and static pressures to opposed portions of said first fluid pressure responsive element; means for applying fluid pressure from a source thereof to one portion of said second fluid pressure responsive element to oppose the force of said total pressure; means including a pair of sonic nozzles in series through which fluid pressure from the previously mentioned source is passed to a region of lower pressure to create a reference pressure and apply the same to an opposed portion of said second fluid pressure responsive element; and means actuated by said fluid pressure responsive elements to cause a variable signal.

References Cited in the file of this patent

UNITED STATES PATENTS

| 1,129,073 | Connet | Feb. 23, 1915 |
| 2,487,679 | Stover | Nov. 8, 1949 |
| 2,507,075 | Wiegand et al. | May 9, 1950 |
| 2,628,086 | Cutler | Feb. 10, 1953 |
| 2,863,601 | Torell | Dec. 9, 1958 |
| 2,886,968 | Johnson et al. | May 19, 1959 |

FOREIGN PATENTS

| 486,531 | France | Jan. 21, 1918 |
| 20,706 | France | Nov. 30, 1918 |
| 190,121 | Great Britain | Mar. 31, 1924 |